Oct. 27, 1936.  W. G. VAN VOORHIS  2,058,533
AUXILIARY STEERING CONTROL FOR MOTOR VEHICLES
Filed June 17, 1936   2 Sheets-Sheet 1

Inventor
William G. Van Voorhis

By Owen & Owen
Attorneys.

Oct. 27, 1936.   W. G. VAN VOORHIS   2,058,533
AUXILIARY STEERING CONTROL FOR MOTOR VEHICLES
Filed June 17, 1936   2 Sheets-Sheet 2
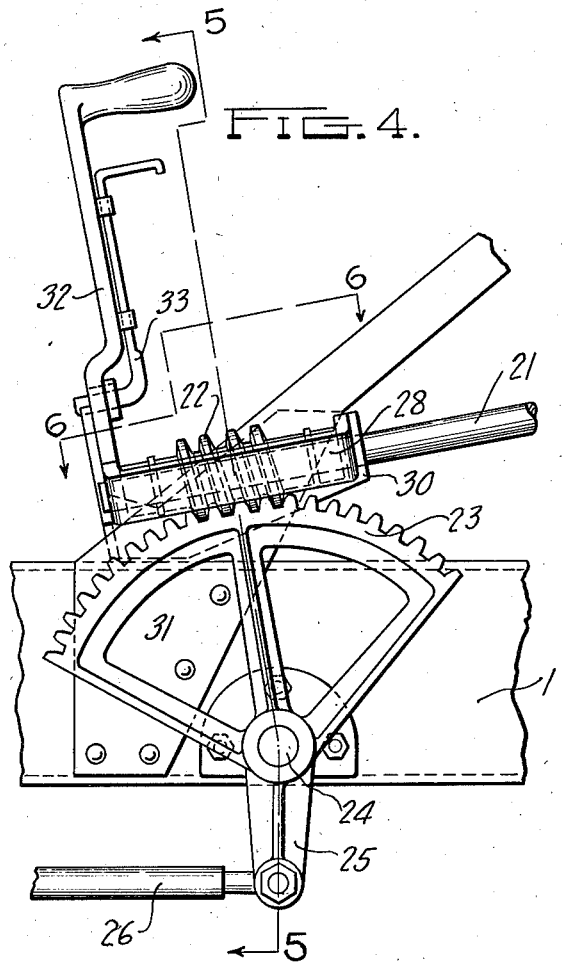
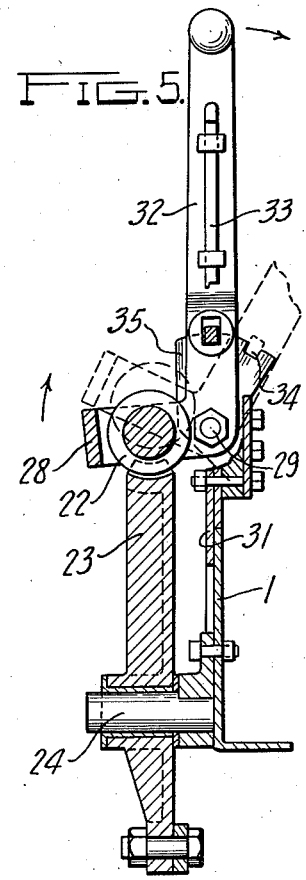
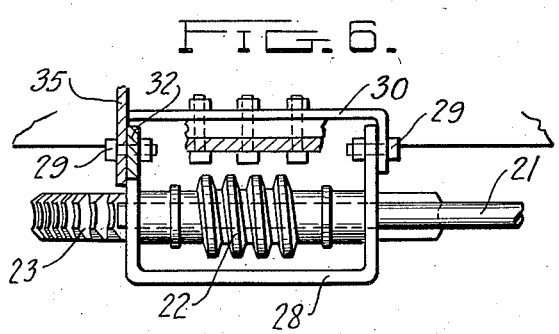
Inventor
William G. Van Voorhis
By Owen & Owen,
Attorneys Patented Oct. 27, 1936

2,058,533

UNITED STATES PATENT OFFICE 2,058,533

AUXILIARY STEERING CONTROL FOR MOTOR VEHICLES

William G. Van Voorhis, Findlay, Ohio, assignor to The Buckeye Traction Ditcher Company, Findlay, Ohio, a corporation of Ohio Application June 17, 1936, Serial No. 85,688

4 Claims. (Cl. 280—95)

This invention relates to steering controls for vehicles of the motor driven type, and particularly to a supplemental steering control for such vehicles.

In various machines of the motor driven vehicle type, for instance trench digging machines, it is desirable, under certain conditions of use, to control the steering from the front end of the machine in the usual manner, and, under other conditions of use, to control the steering from a remote point, such as from the rear of the vehicle.

The object of the present invention is the provision, in combination with the main steering control of a vehicle, of an auxiliary control which serves as an extension of a part of the main control and enables the vehicle to be steered from a remote point.

A further object of the invention is the provision, in combination with main and remote steering controls of the character described, of simple and efficient means which is operable to connect or disconnect the auxiliary control from the steering means, whereby such means can be alone operated from the main control.

The invention is fully described in the following specification, and while in its broader aspect it is capable of embodiment in numerous forms, one embodiment thereof is illustrated in the accompanying drawings, in which—

Figure 1:
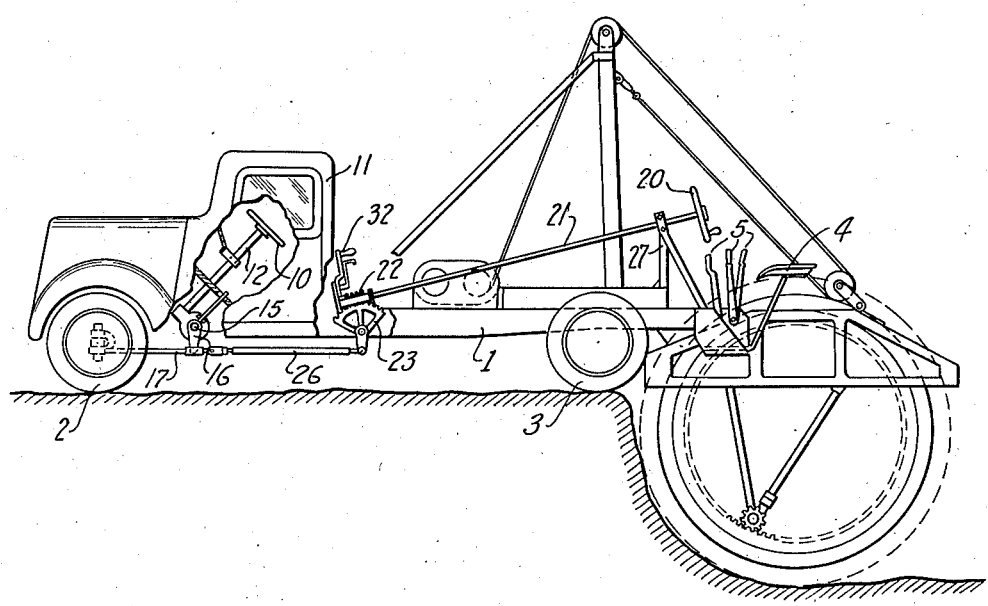
Figure 2:
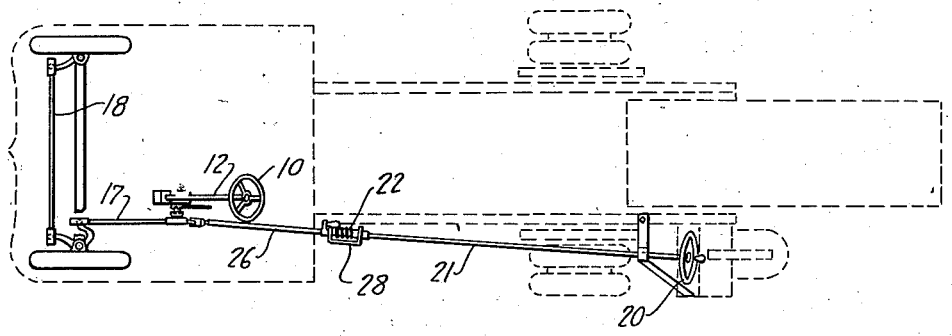
Figure 3:
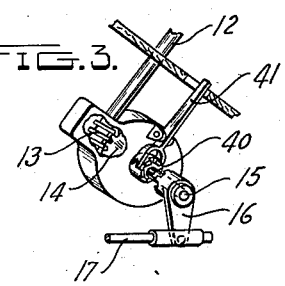

Figure 1 is a side elevation of a trench excavating machine embodying the invention and with parts broken away and parts removed; Fig. 2 is a plan view thereof showing the steering control mechanism in full; Fig. 3 is an enlarged perspective detail of a part of the main steering mechanism showing a manner of disconnecting the main manual control from said mechanism; Fig. 4 is an enlarged side elevation of a portion of the auxiliary steering control mechanism and of a means for connecting and disconnecting such control, and Figs. 5 and 6 are sections, respectively, on the lines 5—5 and 6—6 in Fig. 4.

Referring to the drawings, I designates the frame of a motor driven truck having the customary front steering wheels 2 and rear tractor wheels 3, the driving means for the latter forming no part of the present invention, and therefore not being shown.

The truck, in the present instance, is shown equipped at its rear end with a trench digging mechanism of the wheel type. The seat 4 for the operator and the controls 5 for the excavating mechanism are disposed at the rear end of the truck.

The main steering control may be of any suitable type and is shown, in the present instance, as comprising a hand wheel 10 located in the driver's cab 11 and having the lower end of the post 12 connected through a worm 13 and worm wheel 14 to a cross shaft 15. The shaft 15 is connected by an arm 16 to a link 17, the forward end of which is connected to a steering knuckle of one of the front wheels 2. A cross-link 18 connects arms on the knuckles of the two wheels in the usual manner.

The auxiliary steering control comprises a hand wheel 20 disposed in convenient reach of an operator sitting on the seat 4, and has its post or shaft 21 extending forward and downward to a point adjacent to the cab 11 and there provided with a worm 22 in mesh with a segmental worm wheel 23 mounted for rocking movements on a stub shaft 24 attached to one of the frame sills 1 of the truck. The segment 23 has an arm 25 projecting downward from its bottom portion and connected by a link 26 to the draft link 17 of the main steering mechanism. The steering wheel shaft 21 is mounted near its rear end in a bracket 27 rising from the rear end portion of the frame 1, and its forward end, in the present instance, at opposite sides of the worm 22, is journaled in the legs of a U-shaped shipper lever 28. The free ends of the legs of such lever are fulcrumed at 29 to a bracket 30, the supporting leg 31 of which is fixedly secured to a side of the adjacent frame sill 1 and rises therefrom. The bracket 30, in the present instance, is of shallow U-form with its legs forming the fulcrum support for the lever member 28.

One leg of the lever member 28 has a control arm 32 projecting upward therefrom and carrying a hand operated latch member 33, which is adapted to releasably engage within one or the other of a pair of notches 34 of a segment 35 to retain the shipper lever in one or the other of its positions of adjustment, as indicated by full and dotted lines in Fig. 5. When the shipper lever is in the full line position shown, the worm 22 is held in meshing engagement with the gear segment 23, thus causing a turning of the shaft 21 to impart longitudinal movement in one direction or the other to the connected draft links 17, 26. It is apparent that when the shipper lever is in the dotted line position shown in Fig. 5, the worm 22 is held in disconnected relation to the gear segment 23. The stationary segment 35 rises from and forms a part of the forward leg of the bracket 30.

When the steering of the vehicle is being controlled through the wheel 10 of the main steering control, the worm 22 and gear 23 of the auxiliary control mechanism may be disconnected by a movement to the right of the shipper lever handle 22, thus rendering the auxiliary steering control inoperative. When, however, it is desired to steer the vehicle from the rear of the machine through the auxiliary steering control, the worm 22 is lowered into mesh with the gear segment 23 by a proper movement of the shipper lever 28, 32, and the operator may then control the steering by a turning of the rearwardly disposed wheel 20 and its shaft 21. If the steering connection of the main steering wheel shaft 12 with the draft link 17 is sufficiently reversible to permit movement to be communicated to such shaft from the rocker arm 16, no attention need be paid to the main steering control when the auxiliary steering control is being operated. If, however, the gear connection of the main steering control is of a type which locks against movement when power is applied from the draft link side thereof, such gear connection may be provided with a release clutch 40 controlled by the movement of a clutch shifting lever 41, as illustrated in Fig. 3, thus permitting the main hand control to be entirely disconnected from the steering wheels when the auxiliary control is in use. The lever 41 may extend through the floor board of the cab in position to be shifted by the foot of the driver.

I wish it understood that my invention is not limited to any specific construction, form or arrangement of the parts, as it is capable of numerous modifications and changes without departing from the spirit of the claims.

Having thus described my invention, what I claim as new, and desire to secure by United States Letters Patent, is:

1. In a power driven vehicle, a main steering control mechanism, an auxiliary steering control mechanism connected to said first mechanism and operable at a remote point therefrom, said auxiliary mechanism including meshing gears, a shipper lever connected to one of said gears and operable to disconnect it from its companion, and means for retaining the shipper lever in different positions of its throw.

2. In a motor driven vehicle, the combination with a main steering control mechanism having a rearwardly extending draft link, of an auxiliary steering mechanism operable from a point adjacent to the rear end of the vehicle in remote relation to the first mechanism, said auxiliary mechanism including a draft link extension connected to said first draft link, a hand wheel shaft extending forwardly from the rear end of the vehicle, a gear connection between said shaft and draft link extension, and means operable to disconnect said gear connection.

3. In a motor driven vehicle, the combination with a main front steering control mechanism, of an auxiliary steering mechanism operatively connected to said front mechanism and having its point of control adjacent the rear end of the vehicle, said auxiliary mechanism including a forwardly extending control wheel shaft, a worm on the forward end of said shaft, a gear wheel adapted to mesh with said worm and having connection with the front steering mechanism to impart steering movements thereto, a stationary mount for the rear end of said shaft, a shipper lever mount for the forward end of said shaft manually operable to move said worm into and out of engagement with the worm wheel.

4. In a motor driven vehicle, a main front steering control mechanism including a draft link, an auxiliary steering control mechanism connected to said draft link and having its point of control near the rear end of the vehicle, said auxiliary mechanism including a laterally shiftable control wheel shaft, a worm and gear wheel connection between said shaft and draft link with the worm mounted on the forward end portion of the shaft, a stationary bracket near the forward end of said shaft, a U-shape shipper lever having its legs receiving said shaft at opposite ends of the worm and fulcrumed to said bracket at one side of the shaft and having a control arm for rocking the lever to move the worm into and out of mesh with the worm wheel, and means for releasably securing the shipper lever in various positions of its movement.

WILLIAM G. VAN VOORHIS.